US012148013B2

(12) United States Patent
McDonald et al.

(10) Patent No.: US 12,148,013 B2
(45) Date of Patent: Nov. 19, 2024

(54) DISTRIBUTED AND AUTOMATED TRANSACTION SYSTEMS, METHOD, AND APPARATUS

(71) Applicant: 365 Retail Markets, LLC, Troy, MI (US)

(72) Inventors: Paul McDonald, Diablo, CA (US); Ashwath Rajan, San Francisco, CA (US); Tyler Garvin, San Francisco, CA (US)

(73) Assignee: 365 Retail Markets, LLC, Troy, MI (US)

( * ) Notice: Subject to any disclaimer, the term of this patent is extended or adjusted under 35 U.S.C. 154(b) by 102 days.

(21) Appl. No.: 17/378,165

(22) Filed: Jul. 16, 2021

(65) Prior Publication Data

US 2021/0342903 A1    Nov. 4, 2021

Related U.S. Application Data

(63) Continuation of application No. 15/826,508, filed on Nov. 29, 2017, now Pat. No. 11,068,949.

(Continued)

(51) Int. Cl.
| | |
|---|---|
| *G06Q 30/00* | (2023.01) |
| *G06Q 10/087* | (2023.01) |
| *G06Q 20/10* | (2012.01) |
| *G06Q 20/20* | (2012.01) |
| *G06Q 20/22* | (2012.01) |
| *G06Q 30/06* | (2023.01) |
| *G06T 7/73* | (2017.01) |
| *G06V 10/22* | (2022.01) |

(Continued)

(52) U.S. Cl.
CPC .......... *G06Q 30/06* (2013.01); *G06Q 10/087* (2013.01); *G06Q 20/102* (2013.01); *G06Q 20/208* (2013.01); *G06Q 20/22* (2013.01); *G06T 7/74* (2017.01); *G06T 7/75* (2017.01); *G06V 10/22* (2022.01); *G06V 20/46* (2022.01); *G06V 40/107* (2022.01); *G07G 1/0036* (2013.01); *G06T 2207/10016* (2013.01); *G06T 2207/30196* (2013.01); *G06V 20/44* (2022.01); *H04L 67/10* (2013.01)

(58) Field of Classification Search
None
See application file for complete search history.

(56) References Cited

U.S. PATENT DOCUMENTS

| D808,202 S | 1/2018 | Hawkins et al. | |
| 10,679,177 B1 * | 6/2020 | Liberato, Jr. | ........ G06Q 10/087 |

(Continued)

OTHER PUBLICATIONS

Marder, M., Using image analytics to monitor retail store shelves, Mar. 1, 2015, IBM Journal of Research and Development, vol. 59, issue 2/3, pp. 1-11 (Year: 2015).*

(Continued)

*Primary Examiner* — Jeffrey A. Smith
*Assistant Examiner* — Timothy J Kang
(74) *Attorney, Agent, or Firm* — Young Basile Hanlon & MacFarlane, P.C.

(57) ABSTRACT

Methods and apparatus are described that use machine vision and machine learning to eliminate many of the steps of a typical retail transaction. For example, implementations are contemplated in which a user simply removes an item from a retail location to effect the transaction.

20 Claims, 13 Drawing Sheets

Related U.S. Application Data

(60) Provisional application No. 62/432,423, filed on Dec. 9, 2016.

(51) Int. Cl.
    *G06V 20/40*    (2022.01)
    *G06V 40/10*    (2022.01)
    *G07G 1/00*    (2006.01)
    *H04L 67/10*    (2022.01)

(56) References Cited

U.S. PATENT DOCUMENTS

| | | |
|---|---|---|
| 2013/0076898 A1 | 3/2013 | Philippe et al. |
| 2013/0262252 A1 | 10/2013 | Lakshman et al. |
| 2013/0284806 A1* | 10/2013 | Margalit ............... G07G 1/0009 235/382 |
| 2014/0117818 A1 | 5/2014 | Dipaolo et al. |
| 2015/0019391 A1 | 1/2015 | Kumar et al. |
| 2016/0240025 A1* | 8/2016 | Bashkin .................. E05B 41/00 |
| 2017/0004472 A1* | 1/2017 | Tkachenko ............ G06Q 20/18 |
| 2018/0150685 A1* | 5/2018 | Ebrom ................... G06V 20/52 |

OTHER PUBLICATIONS

Amazon, "Amazon Go: Frequently Asked Questions," website: htt2s://vvwwv,amazon,com/b?node=I6008589011, Downloaded Nov. 21, 2017.

Fleuret, et al., "Multi-Camera People Tracking with a Probabilistic Occupancy Map," Swiss Federal Office for Education and Science and Indo Swiss Joint Research Programme, Mar. 27, 2007.

Liu, et al., "SSD: Single Shot MultiBox Detector," UNC Chapel Hill, Zoox Inc., Google Inc., University of Michigan, Ann-Arbor, Dec. 29, 2016.

Pantry, "Pantry: Sell Food. Anytime. Anywhere.," website:http://pantryrdai1 .corn/, Downloaded Nov. 21, 2017.

* cited by examiner

DISTRIBUTED AND AUTOMATED TRANSACTION SYSTEMS, METHOD, AND APPARATUS

RELATED APPLICATION DATA

The present application is a continuation of U.S. application Ser. No. 15/826,508, filed Nov. 29, 2017, which claims the benefit of U.S. Provisional Application Ser. No. 62/432,423, filed on Dec. 9, 2016, the entire disclosures of which are incorporated herein by reference for all purposes.

BACKGROUND

Online retail is growing at about 20% annually but still only represents 7-8% of overall retail sales. Convenience and proximity continue to be driving factors in most retail purchases. However, a primary frustration of regular shoppers at conventional "brick and mortar" stores is checkout lines. For example, in a traditional grocery store shoppers place items from the shelf into a cart or basket and when finished proceed to a checkout line where they have to wait for people that were in line before them to have their items taken out of their carts, scanned, placed in bags, and then back into their carts. Finally each customer has to pay using cash or a credit card; often in conjunction with the use of a loyalty card or a phone number. This process can often take up to 20 minutes on a typical evening. Self-checkout helps a little by increasing the number of checkout lanes but the customer experience typically isn't any better. "Tap-to-pay" solutions address the very narrow issue of customers having to pull out their wallets, but don't address any of these other issues.

SUMMARY

According to a particular class of implementations, a system includes a product enclosure including one or more shelves for placement of a plurality of products, one or more cameras, one or more processors, and a network connection. The one or more processors are configured to, using the one or more cameras, capture a sequence of images associated with a transaction involving one or more of the products. The one or more processors are also configured to, using the network connection, transmit the sequence of images to a remote back end infrastructure. The back end infrastructure includes one or more computing devices operating in a network. The one or more computing devices are configured to receive the sequence of images from the product enclosure via the network. The one or more computing devices are also configured to process the sequence of images to (1) identify a hand reaching into the product enclosure, (2) determine a location of the hand within the enclosure, and (3) identify a first product grasped by the hand. The one or more computing devices are also configured to charge an account associated with the user a transaction amount for the transaction, the transaction amount including a first amount corresponding to the first product.

According to a specific implementation, the one or more computing devices or the one or more processors are further configured to identify the user by one of (1) biometric identification, (2) detection of a machine readable code corresponding to the user, or (3) receiving a code corresponding to the product enclosure transmitted from a device corresponding to the user.

According to another specific implementation, the one or more processors are further configured to, using the one or more cameras, determine that a human is in front of the product enclosure.

According to another specific implementation, the one or more computing devices are further configured to process the sequence of images to discard one or more subsets of the images that do not include the hand.

According to another specific implementation, the one or more computing devices are configured to process the sequence of images to determine a location of the hand within the enclosure based on a model of a spatial context of the product enclosure. According to an even more specific implementation, the one or more computing devices are configured to process the sequence of images to identify the first product grasped by the hand based on a product location schema associated with the spatial context.

According to another specific implementation, the one or more computing devices are configured to process the sequence of images using a localization model to focus on portions of individual images in which the hand appears.

According to another specific implementation, the one or more computing devices are further configured to process the sequence of images to identify one or more changes within the product enclosure between successive images.

According to another specific implementation, the product enclosure has one or more doors, and the one or more processors are further configured to unlock the one or more doors in response to a message from the back end infrastructure, and transmit the sequence of images to the back end infrastructure in response to the one or more doors locking, or in response to passage of a predetermined period of time.

According to another specific implementation, the product enclosure has one or more doors, and the one or more processors are further configured to determine that the one or more doors have been open longer than a predetermined period of time, passively record video using the one or more cameras, and, periodically transmit a frame of the video to the back end infrastructure using the network connection. According to an even more specific implementation, the one or more computing devices are further configured to process the frames of the video received from the product enclosure to identify one or more changes within the product enclosure between successive ones of the frames, and request upload of the video from the product enclosure in response to identification of the one or more changes.

According to another class of implementations, a product enclosure includes one or more shelves for placement of a plurality of products, one or more cameras, a network connection, and one or more processors configured to, using the one or more cameras, capture a sequence of images associated with a transaction involving one or more of the products. The one or more processors are also configured to, using the network connection, transmit the sequence of images to a remote back end infrastructure.

According to a specific implementation, the one or more processors are further configured to facilitate identification of the user by one of (1) capturing biometric identifying information, (2) detecting a machine readable code corresponding to the user, or (3) receiving a code transmitted from a device corresponding to the user.

According to another specific implementation, the one or more processors are further configured to, using the one or more cameras, determine that a human is in front of the product enclosure.

According to another specific implementation, the product enclosure has one or more doors, and the one or more processors are further configured to unlock the one or more doors in response to a message from a back end infrastructure, and transmit the sequence of images to the back end infrastructure in response to the one or more doors locking, or in response to passage of a predetermined period of time.

According to another specific implementation, the product enclosure has one or more doors, and the one or more processors are further configured to determine that the one or more doors have been open longer than a predetermined period of time, passively record video using the one or more cameras, and periodically transmit a frame of the video to a back end infrastructure using the network connection.

According to another class of implementations, a system includes one or more computing devices operating in a network and configured to receive a sequence of images representing a transaction from a product enclosure via the network. The one or more computing devices are also configured to process the sequence of images to (1) identify a hand reaching into the product enclosure, (2) determine a location of the hand within the enclosure, and (3) identify a first product grasped by the hand. The one or more computing devices are also configured to charge an account associated with the user a transaction amount for the transaction, the transaction amount including a first amount corresponding to the first product.

According to a specific implementation, the one or more computing devices are further configured to identify the user by one of (1) biometric identification, (2) detection of a machine readable code corresponding to the user, or (3) receiving a code corresponding to the product enclosure transmitted from a device corresponding to the user.

According to another specific implementation, the one or more computing devices are further configured to process the sequence of images to discard one or more subsets of the images that do not include the hand.

According to another specific implementation, the one or more computing devices are configured to process the sequence of images to determine a location of the hand within the enclosure based on a model of a spatial context of the product enclosure.

According to another specific implementation, the one or more computing devices are configured to process the sequence of images to identify the first product grasped by the hand based on a product location schema associated with the spatial context.

According to another specific implementation, the one or more computing devices are configured to process the sequence of images using a localization model to focus on portions of individual images in which the hand appears.

According to another specific implementation, the one or more computing devices are further configured to process the sequence of images to identify one or more changes within the product enclosure between successive images. According to an even more specific implementation, the one or more computing devices are further configured to process the frames of the video received from the product enclosure to identify one or more changes within the product enclosure between successive ones of the frames, and request upload of the video from the product enclosure in response to identification of the one or more changes.

A further understanding of the nature and advantages of various implementations may be realized by reference to the remaining portions of the specification and the drawings.

DETAILED DESCRIPTION

Figure 1:
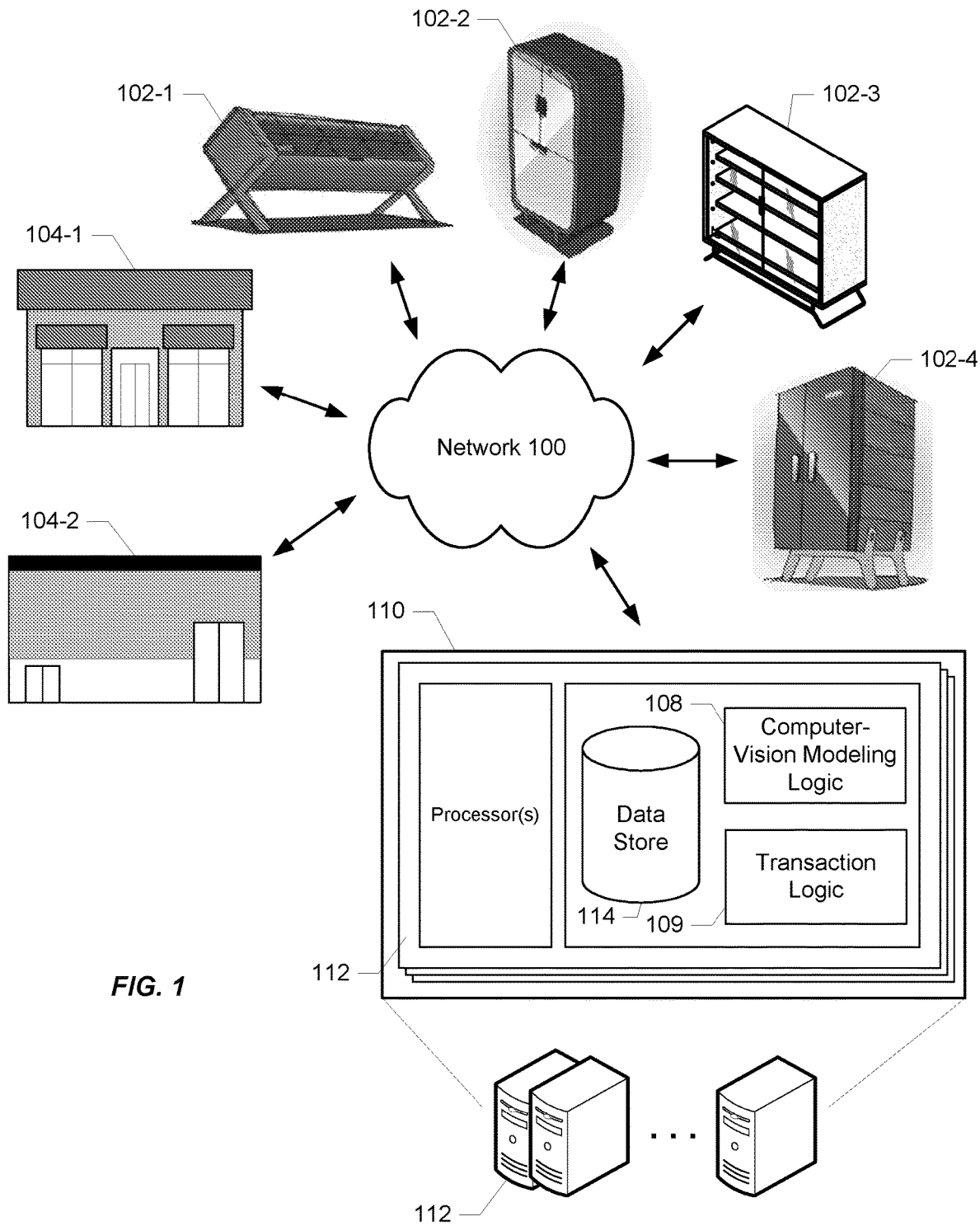
FIG. 1 is a simplified diagram of a system enabled by the present disclosure.

This disclosure describes systems and techniques that remove much of the "friction" associated with conventional retail settings. Through the use of machine vision and learning many of the steps of the typical retail transaction can be eliminated. For example, implementations are contemplated in which a user simply removes an item from a retail location to effect the transaction. Automated inventory tracking for a retail location is also enabled by the present disclosure. By focusing attention on salient moments of an interaction between a user and a retail location, "seeing" what is removed from the inventory, and understanding by whom, systems enabled by the present disclosure can facilitate retail transactions as well as track and replenish inventory.

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure. In addition, specific details may be provided in order to promote a thorough understanding of the described implementations. Some implementations within the scope of this disclosure may be practiced without some or all of these details. Further, well known features may not have been described in detail for the sake of clarity.

According to a particular class of implementations, an automated retail system is enabled in which a user can walk into a "brick and mortar" store, remove items from the shelves, and walk out, having completed a transaction for the selected items without going through a checkout line. The system includes cameras and software that track users throughout the store and can identify when they have removed or replaced an item on a shelf, and what that item is. The system includes an image recognition component the operation of which is based on various computer-vision machine-learning (ML) models trained on images of humans and specific products in the store. According to some of these implementations, the ML models employ TensorFlow, Inception_v3, Google's open source deep convolutional neural network (CNN), as well as detection and localization CNNs and Recurrent Nets which focus attention, and capture state and state transitions. The system may also include a user identifier component that identifies the user based on any of a variety of mechanisms such as, for example, stored biometric data (e.g., facial recognition), visual codes (e.g., Quick Response (QR) codes, bar codes, etc.) presented on a screen of a mobile device, or messages transmitted from user-specific devices (e.g., from an app on the user's smart phone), to name a few representative examples. User identity is tied to some form of payment, e.g., a credit card, bank account, etc.

According to a particular implementation, a user signs up for the automated retail service by downloading an app to their mobile device. Once the app is downloaded it may ask the user to take a picture or video of her/his face or provide other biometric identification information (e.g., a fingerprint) so that the system can recognize her/him when she/he enters a store. The user is also asked to provide payment information (e.g., by adding a credit or debit card to her/his account) so that the system can automatically charge her/him upon exiting a store. A credit card, debit card, or other form of payment could be added by manual entering of the requisite information. It may also be added using, for example, the Stripe API or other similar tools.

When the user enters an automated retail store and is identified the system creates a new record representing the transaction. As the user walks through the aisles and removes items from the shelves, corresponding images (still or video) are processed using the computer-vision models and the products identified as being removed from the shelves are added to the record. Similarly, products replaced on the shelves may be identified and removed from the record. Each product identification is based on a prediction by the underlying computer-vision models that may be represented by a probability distribution across one or more possible products. According to some implementations, additional information may be used to improve on the accuracy of these predictions.

For example, the user's location in the store and/or the shelf from which an object was removed can be used to improve a confidence level associated with a prediction (e.g., based on an understanding of a predetermined schema by which products are stocked). In another example, a user's previous transactions can be used (i.e., users will often purchase the same products). In yet another example, information about the products already in the user's cart or basket can be used (e.g., by identifying complementary or alternative products). Anomaly detection models and protocols may also be implemented for situations in which the confidence level associated with a transaction is sufficiently low.

According to some implementations, product identification can be improved using one or more cameras in the user's shopping cart or basket. As products are placed in the cart or basket additional images (still or video) may be taken. These images can be processed using the computer-vision models for comparison of the contents of the cart to the existing record. For cases in which there are conflicts or the contents of the cart or basket are unclear, a human review of the images may be conducted for confirmation. Another way in which such conflicts might be resolved is through presentation of the contents of the cart or basket in an interface in the user's app for confirmation by the user.

Once the products selected by the user have been confirmed and upon the occurrence of some predetermined event (e.g., the user leaving the store), the user's account is charged using the payment information previously provided by the user, and an itemized receipt is sent to the user, e.g., via email and/or a notification in the app. The transaction record may then be stored and may be used for a variety of purposes such as, for example, creating a shopping list for the next transaction, and/or for promotions and product recommendations.

Access to the automated retail store may be controlled using the mechanisms for identifying users. This would allow for a store that is accessible 24 hours a day, seven days a week. This might involve the use of facial or fingerprint recognition at the entryway of the store. An alternative access control mechanism could involve the use of machine-readable codes displayed on the mobile devices of users, e.g., conventional bar codes or short-lived Quick Response (QR) codes. Such a QR code could be provided to the user's device upon, for example, launch of the app, approach to the store location, or in response to a request from the user's device. Another access control mechanism might involve the transmission of a (possibly geo-coded) message from an app on the user's phone indicating that the user is requesting entry to a particular store.

Another class of implementations is intended to further reduce transaction friction by eliminating the requirement that users go to a centralized location (e.g., a conventional brick-and-mortar store), instead bringing the retail location to the user. These implementations involve the deployment of "bodegas" (e.g., product enclosures about the size of conventional vending machines) and the use of computer-vision and machine learning techniques to facilitate transactions. Using these techniques, the system tracks the current inventory of each bodega and the products that go in and out of it. As with the automated retail store, the system facilitates a transaction by recognizing or otherwise identifying a user, recognizing the object(s) a user takes off the bodega's shelves, and charging the user when the transaction is determined to be complete, e.g., when the user shuts the bodega or walks away.

Access to the products on the shelves of the bodega can be controlled via any of a variety of mechanisms, e.g., biometric identification of a user in front of the bodega, using visual codes, messages (which might specify a particular bodega or be geo-coded with the user's location) transmitted from user-specific devices, or any other suitable mechanism. The recognition of an item being pulled from a shelf is accomplished with one or more cameras. For example, one or more downward-facing cameras at the front and top of the bodega can capture video or still images of an item as it is being removed. In addition to capturing images of users for identification and authentication, one or more outward-facing cameras might also be used to track the activity of people in front of the bodega (including detecting that a user might be trying to access the bodega), as well as to recognize the product (or enhance the confidence of the product recognition) as a user walks away. One or more additional cameras (e.g., one or more inward-facing cameras for each shelf in the enclosure) might also be deployed in the enclosure to provide more angles on the transaction and/or to help identify the shelf from which an item was pulled. Other types of sensors might also be used, e.g., infrared detectors. Bodegas enabled by the present disclosure can be deployed in any location that has electricity and a network connection of some kind, e.g., wireless data service.

FIG. 1 shows a computing environment in which techniques enabled by this disclosure may be implemented. The depicted network 100 may include any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Bodegas 102-1, 102-2, 102-3, and 102-4, automated retail store 104-1, and warehouse 104-2, may communicate with platform 110 using any of a variety of mechanisms including, for example, wired connections, cellular data networks (e.g., 3G or 4G connections), wireless connections (e.g., local wi-fi), etc.

Figure 2A:
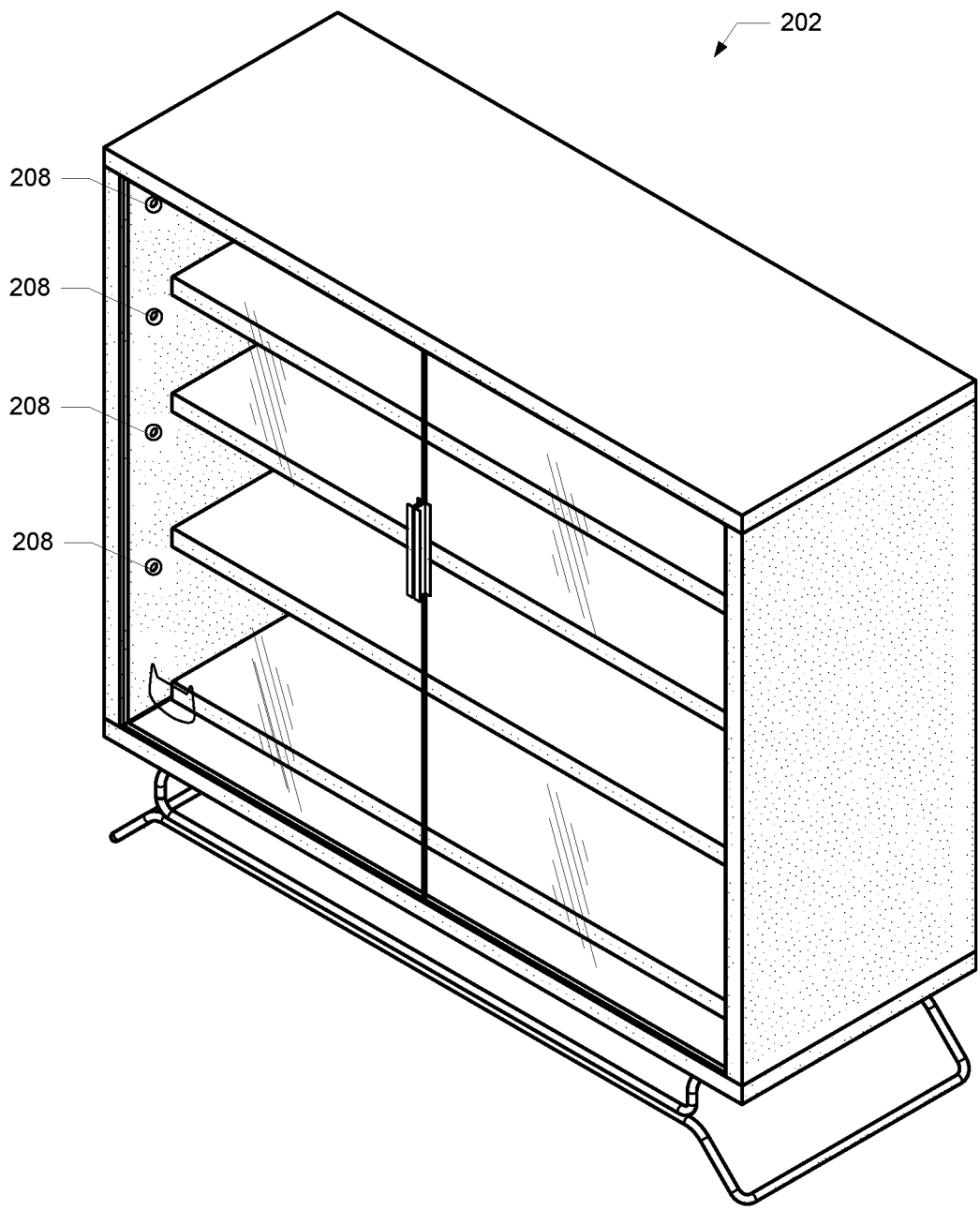
FIG. 2A and FIG. 2B are perspective views of a product enclosure enabled by the present disclosure.
Figure 2B:
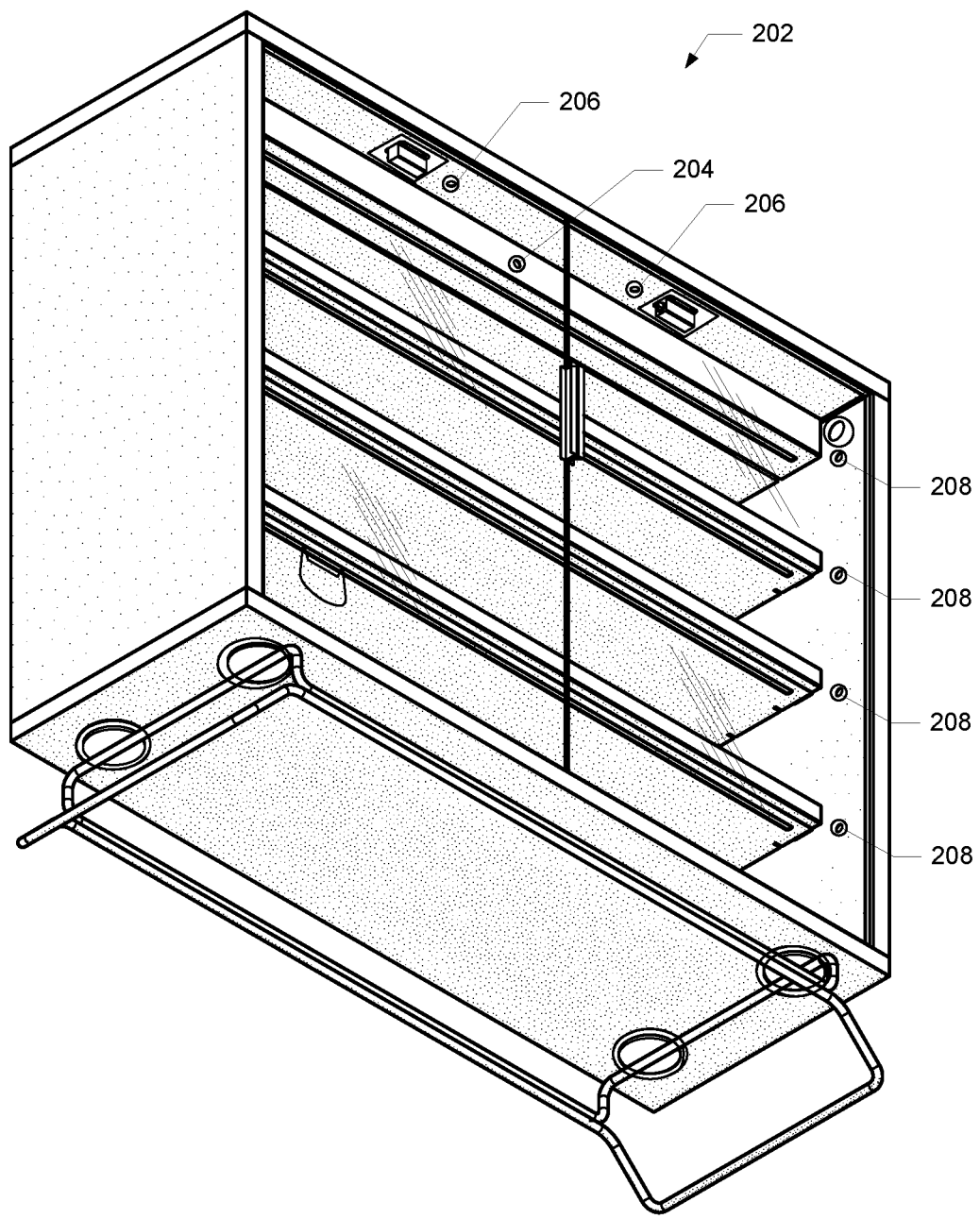

Bodegas 102 include local processing resources, one or more network interfaces, and one or more cameras to capture images (still or video) associated with transactions. As shown in FIGS. 2A and 2B, a particular class of bodegas 202 may include a forward-facing camera 204 and one or more downward facing cameras 206, and one or more cameras 208 for each shelf. Outward-facing camera 204 captures images of activity occurring in front of the bodega for use with, for example, person tracking, facial recognition, product identification, transaction initiation or termination, etc. Downward-facing camera(s) 206 capture images of transaction activity such as, for example, a user's hand entering the bodega, an object being removed from or replaced in the bodega, etc. Inward-facing cameras 208 capture images of each shelf, providing a live inventory view by which the number of items on each shelf, and any changes (e.g., in the numbers or locations of items) can be detected.

Whether embodied in a bodega or a larger automated retail store, each retail location includes software that runs locally (e.g., in the store or on the bodega) and interacts with a suite of tools on platform 110, e.g., modeling and machine learning as represented by computer-vision modeling logic 108, and transaction tracking and evaluation as represented by transaction logic 109. Data store 114 represents, among other things, various computer-vision models, user data, transaction data, etc. Details regarding the various models are described below.

As will be understood, platform 110 may conform to any of a wide variety of architectures such as, for example, a distributed platform deployed at one or more co-locations, each implemented with one or more servers 112. At least some of the examples described herein contemplate implementations based on cloud computing models that enable ubiquitous, convenient, on-demand network access to a shared pool of computing resources (e.g., networks, servers, storage, applications, and services).

According to a particular implementation, the servers of platform 110 are in the cloud, and the bodegas are on a private mesh network. Some of the cloud servers are also connected to the mesh network forming a bridge to the bodegas. The connection to the mesh network can be used for alerting (e.g., Internet out, process fails, bodega door open too long, etc.) and personnel can log in to the mesh network to troubleshoot such issues. The mesh network may be maintained, for example, using is tinc, an open-source, self-routing, mesh networking protocol, used for compressed, encrypted, virtual private networks.

It should also be noted that, despite references to particular computing paradigms and software tools herein, the logic and/or computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, any references to particular protocols herein are merely by way of example. Suitable alternatives known to those of skill in the art for all of these variations may be employed.

According to a particular implementation, platform 110 uses a publisher-subscriber (PubSub) framework that employs asynchronous publishing and retrieves messages later from child processes. When information is generated at a bodega or store, the images (which may be video or a sequence of images) are uploaded to platform 110 for automated and/or manual analysis. Because platform 110 employs a cloud infrastructure, the available computing power adjusts to and scales with the volume of transactions.

The uploaded video for a transaction is evaluated frame-by-frame using a variety of models to identify when relevant changes occur. The transaction is then labeled with what is identified. According to a particular class of implementations, one or more bounding boxes are placed around objects of interest in a frame and the image is cropped so that the relevant portion of the image in the bounding box (or boxes) is passed to an appropriate classifier for labeling. According to a separate class of implementations, one or more bounding boxes are placed around objects of interest in the frame and fed to a separate model, providing the system with "attention" which allows it to track and audit state and state changes. Successive frames can be evaluated to increase the confidence associated with a particular label.

At least some of the labeled transactions may be evaluated by human operators who manually review the video to determine the accuracy of automatically applied labels. The operators apply "ground truth" annotations to the data. This process allows for the detection of drift in the models over time as well as creates training data to re-train the models which can then be pushed back out to the bodegas or stores. Thus, a system enabled by the present disclosure may employ live data gathering based on actual transactions to evolve the machine learning models governing its operation.

Training data may be generated in a variety of ways for the purpose of training various neural networks on different aspects of a transaction. In one example, manual review tools facilitate easy labeling by relatively inexperienced human users, allowing the users to interact with images (e.g., video feeds) from stores or bodegas in a manner similar to playing a video game. Such interactions might be as simple as repeatedly selecting particular areas of interest in the images, e.g., clicking on a user's hand, body, or face, or on a product. In another example, unrefined neural network models are run on raw data and produce labels. The labels are then edited to get to golden set. In yet another example, crowd sourcing techniques (e.g., an Amazon Mechanical Turk pipeline, Crowdflower, etc.) may be employed to generate the labels for the training data.

The image recognition problems solved by implementations enabled by the present disclosure is conceptually different than the image recognition problems solved by online techniques that employ generalized frameworks for recognizing objects in highly heterogeneous images (e.g., Google image search). Unlike such generalized frameworks, the solutions described herein have a clear and constrained application space which leverages highly distributed data gathering to evolve the underlying models.

The detection and tracking of users, i.e., identifying where users are in relation to the bodega and what they are doing, facilitates the initiation of transactions. According to some implementations, it may also allow for something like an online advertising model in the physical world. That is, using a bodega we can capture ad "impressions" (e.g., user looking at a bodega), "clicks" (e.g., a user initiating a transaction), and "conversions" (e.g., a user actually pulling an item from the bodega).

According to a particular class of implementations, transactions are processed in two ways. The first involves the live interaction with the bodega, i.e., the user interacting with the bodega, capturing salient events in the images of the interaction with the bodega (e.g., reach events), and classification of those events (e.g., picked something up, put something back, etc.) along with use of context (e.g., where the user is reaching), to reach a final inference about what happened.

The second way of processing a transaction is an "after the fact" audit in which the system looks at successive images (e.g., before and after images) and computes "diffs" on those, i.e., identifies what has changed. These diffs are used to identify specific objects in the images, but also to build and evolve models by highlighting where the changes occur in the sequence of images. It's the cooperation of these two pieces that allow us to go fully automated and be confident. In cases where the two results don't agree, the process can be escalated up to a human. Because of the narrow application domains, the recognition techniques can be optimized for each domain and/or combined to get a high confidence result.

Figure 3:
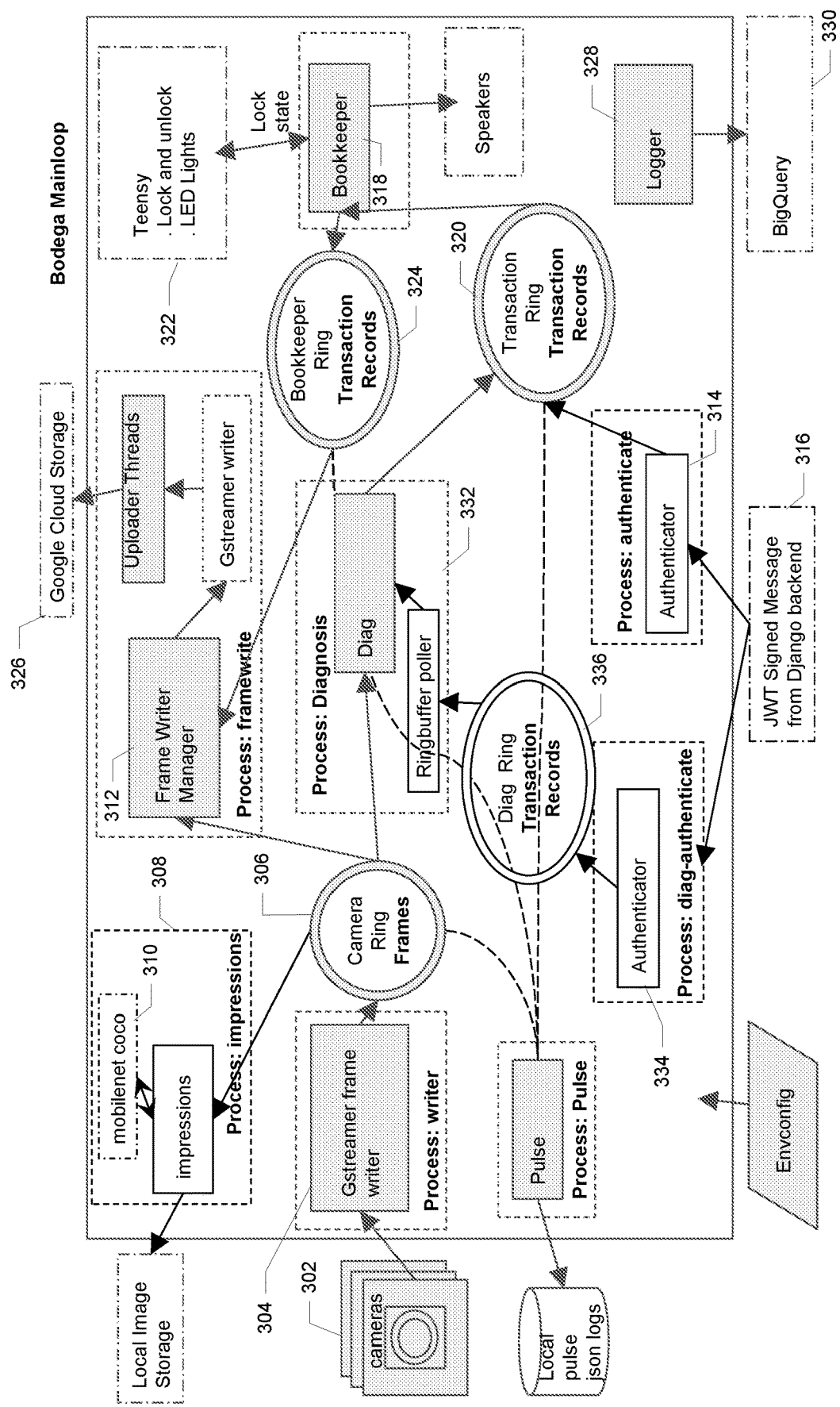
FIG. 3 depicts the operation of a product enclosure enabled by the present disclosure.

Operation of a particular implementation of a transaction system will now be described with reference to FIGS. 3-12. The figures depict mainloop diagrams that illustrate the operation of the bodegas (FIG. 3) and the back end infrastructure processes that evaluate transactions and evolve the underlying models (FIGS. 4-12). The bodega mainloop depicted in FIG. 3 is a Python-based application that drives the storefront with which users interact. The back end infrastructure mainloops can be divided into 3 categories: 1) loops used to collect raw data for labeling via assigned labeling tasks, 2) loops used in the live inference process to drive receipt generation, and 3) loops that perform stateful monitoring of the bodegas.

According a particular class of implementations, there are five types of models on which individual transaction auditing is based. The first relates to the use of diffs, e.g., differences between successive images in a transaction video. The second relates to the internal inventory view, e.g., knowing where items are stocked on the bodega shelves. The third relates to statefulness and/or segmentation, e.g., knowing when and where a user is reaching. The fourth relates to localization, e.g., tracking of hands and faces as an attention mechanism. The fifth relates to geometric context, e.g., making an inference based location. Many generalized recognition problems don't have context to help guide the inference. As will be discussed, at least some implementations enabled by the present disclosure employ an encoded notion of geometric space to support inference.

The input from cameras 302 (running linux for video) are composited into a single feed by a Gstreamer frame writer 304, a multimedia pipeline. In this example, there are eleven cameras; two downward-facing cameras, two inward-facing cameras for each shelf, and one outward-facing camera. The feed is written into Python and put in a ring buffer 306. The use of Python in the various processing loops in the system is enabled by the use c-style interfaces to take advantage of its speed of memory allocation and memory buffers. Ring buffers are used to communicate between processes—thread safe implementations for persistent memory allocation via Python's c-types infrastructure. Multiple readers follow the writer in ring buffer 306. Each of the processes on the bodega manages its own reader from which it continuously pulls the images in ring buffer 306.

An impression monitor 308 gets the frames, runs a lightweight convolutional neural net 310 (e.g., Google's mobilenet) on the data, and sets the global state of whether there is someone in front of the bodega. The mobilenet model that is running on the bodega for person detection is a very lightweight localization model trained on the Microsoft Common Objects in Context (COCO) data set to find faces and to track the number of people in front of the bodega. This prevents anyone from using the bodega unless they are right in front of it. A reach model is also running on the bodega as part of a fraud detection pipeline described below, only detecting reaches when already in that mode.

A frame writer 312 sits and waits, reading fake frames until it is instructed to starting writing a video. An authenticator 314 listens on a specific port until it gets an encrypted message 316 from the back end infrastructure to "open the door." Authenticator 314 sends a corresponding message to bookkeeper 318 (via ring buffer 320). Bookkeeper 318 handles various physical states of the bodega, e.g., unlocks the doors, turns on the lights, plays a sound, etc. The bodega includes a small microcontroller 322 for controlling the lights, locks, and audio using a c-level interface. A Tensorflow model and a small CNN may be used to classify the door state (e.g., open, closed, locked, etc.). This information may be used, for example, to terminate video capture and end the transaction when the door is determined to be closed and locked.

Bookkeeper 318 also sends a message to frame writer 312 (via ring buffer 324) to start recording video. When the doors close, frame writer 312 stops writing and uploads the video to cloud storage 326 at the back end. Logs captured by logger 328 are also uploaded to Google's BigQuery 330 at the back end. A router, e.g., a Cradlepoint 4g LTE router, and a telecommunications service, e.g., Verizon, AT&T, etc., are used for the internet connection. Multiple SIM cards may be used for redundancy.

As will be described, when the video is uploaded, a notification is posted that there is a new transaction for processing. A message gets posted to a PubSub messaging queue which is read by a reach segmenter process which then grabs the video, runs the reach model on it, and segments it down to the relevant pieces for processing by the rest of the transaction pipeline.

The bodega mainloop depicted in FIG. 3 may operate in two modes. The first is to facilitate transactions as a storefront, accepting authentication packets from the back end when users authenticate. The second is a diagnostic mode in which technicians can test functionality of individual hardware components, and get easy access to the bodega for maintenance and stocking. The diagnostics mode allows for the bodega to be placed in a slave mode in which it no longer takes transactions but can be controlled remotely (e.g., lock/unlock doors, play open/close chimes, flash lights, start dummy transaction, etc.) to ensure the hardware is working properly. This is represented in FIG. 3 by diagnosis process 332 which can interact with bookkeeper 318 (via ring buffers 320 and 324) and can interact with the back end via authenticator 334 and ring buffer 336.

According to some implementations, new code (including model updates) may be pushed to each of the bodegas on the mesh network using a cloud service called Consul by HashiCorp, in response to which each reboots with the new code. This supports scaling of the system in that it facilitates versioning and deployment.

Figure 4:
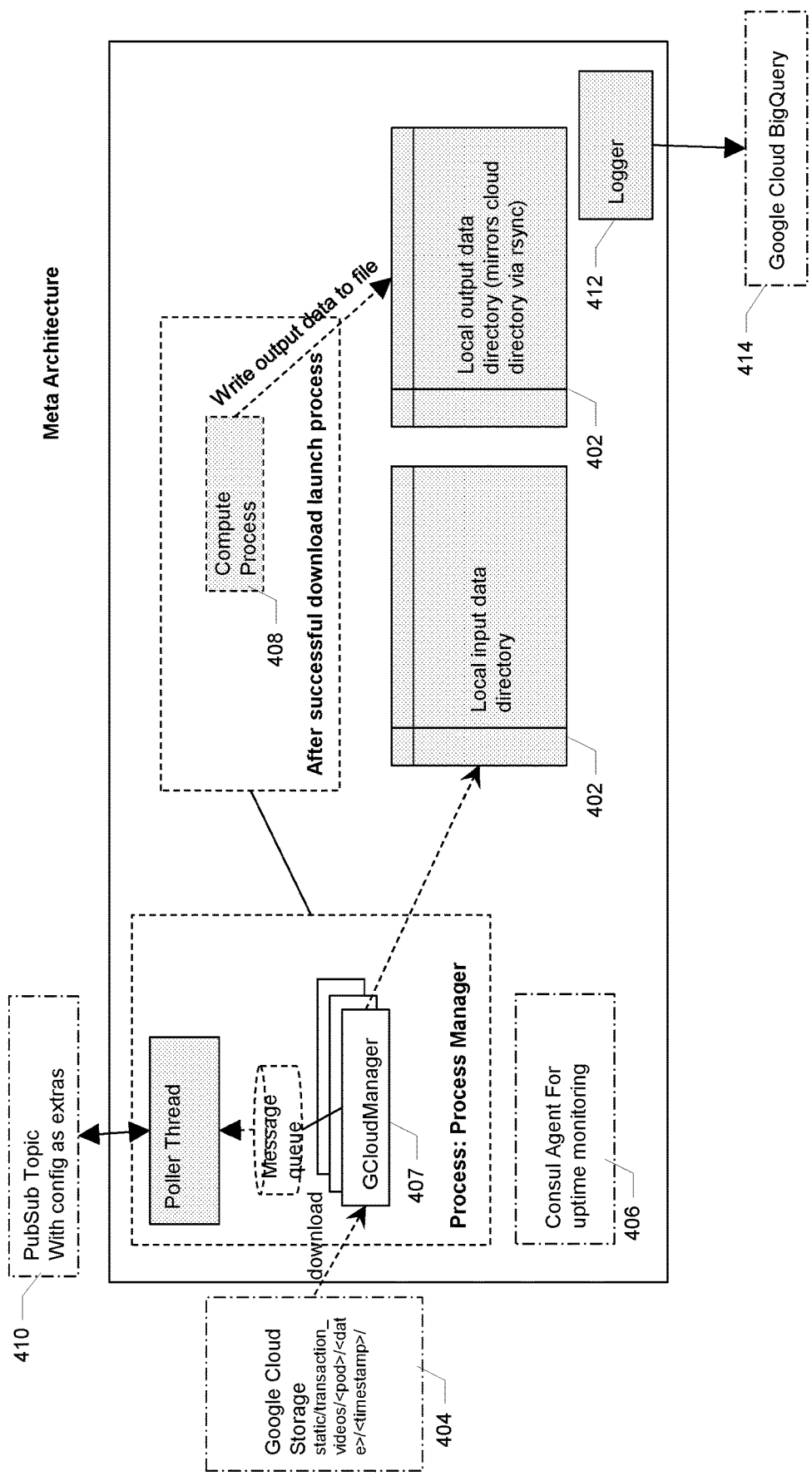
FIGS. 4-12 collectively depict the operation of a transaction processing and machine learning infrastructure enabled by the present disclosure.
Figure 5:
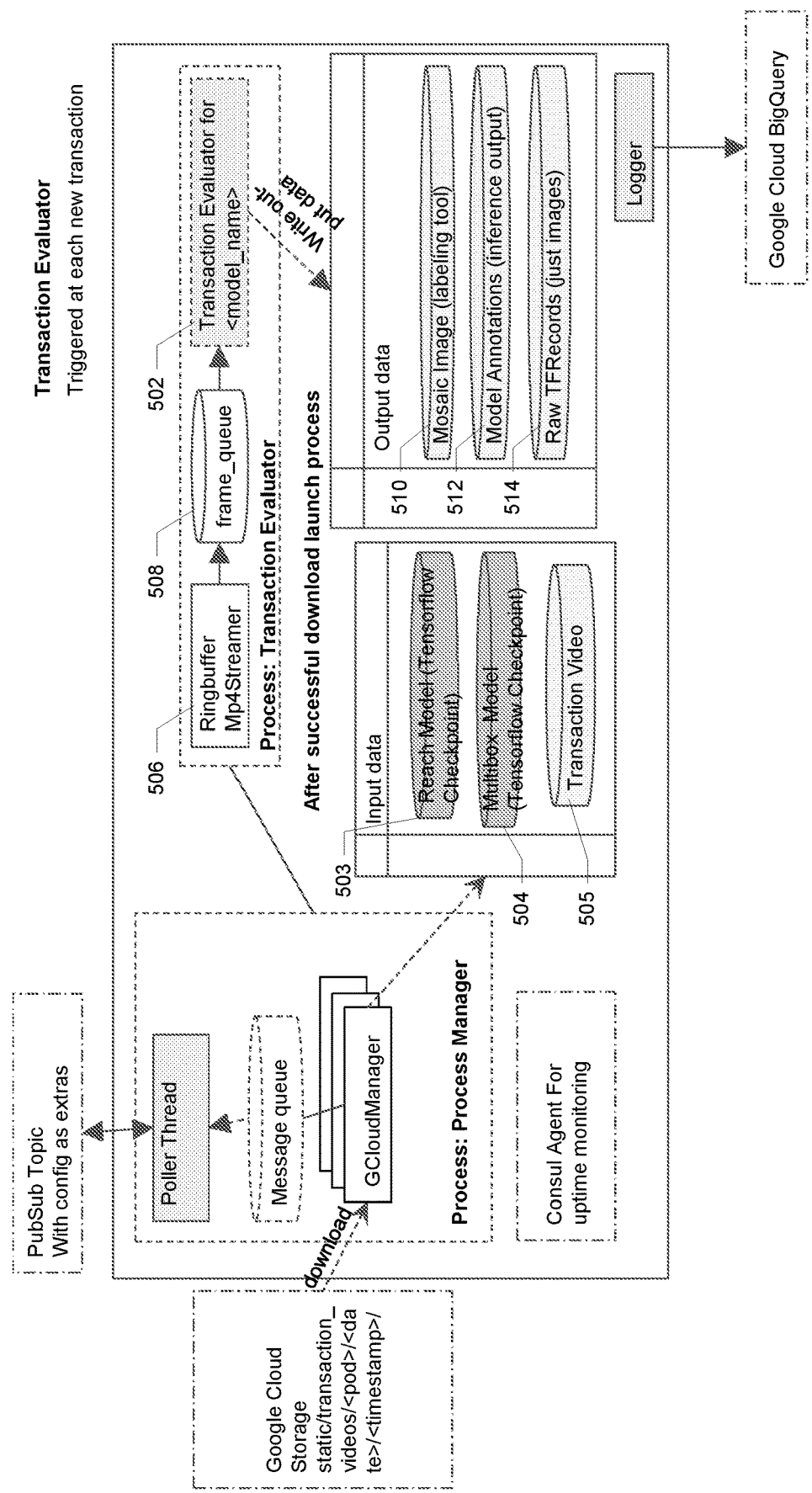

According to the implementation depicted in FIGS. 4-12, the back end system infrastructure is hosted on cloud GPU instances that can be instantiated as needed. This allows for the scalable processing of transactions. The "meta architecture" compute mainloop depicted in FIG. 4 represents a general compute scheme for the different types of compute loops that process inputs from bodegas. The outputs 402 of each loop's models are synchronized with a central cloud data store 404 via the rsync protocol. Each process has a local directory in which it writes its outputs and that mirrors the cloud directory and which syncs from the local directory to the cloud. The health of each loop's compute processes is monitored with Consul's microservice infrastructure 406. Monitoring of the various components of the back end infrastructure allows for evaluation of the size of the current transaction queue, and the creation of GPU instances as needed. The compute processes are agnostic as to the underlying file structure employed by the compute infrastructure. Each process simply writes data to wherever the Gcloud namespace manager 407 points it and that information automatically gets mirrored to the cloud. Logs captured by logger 412 are written to Google's BigQuery 414 so that inferences tied to specific transactions IDs are queryable for subsequent analysis.

Compute process 408 is a generic placeholder that represents the functionality of the different types of compute mainloops depicted in FIGS. 5-12, i.e., transaction evaluator, annotation rectifier, reach segmenter, recurrent evaluator, item diff identifier, item diff harvester, take-a-picture, and fraud mode identifier. As will be described, the transaction infrastructure represented generically in FIG. 4 is employs five models that generate states which tie together in various ways to support transactions and inventory tracking and management.

Each compute mainloop operates via a PubSub messaging queue 410 that allows for transmission of timestamped messages representing meaningful events in transactions. Triggers are caused by four types of events: 1) a new transaction, 2) downstream processing for sequential models running on top of data from new transactions, 3) completion of a labeling task (indicating that new machine learning training examples are available for writing to the data store), and 4) availability of an image of the front of a bodega after re-stocking (for processing according to a product location schema model).

The generic flow of each compute mainloop is as follows: 1) listen for any PubSub message; waiting idly until a new one arrives; 2) When a PubSub message arrives, perform validation on the payload of the message, i.e., we expect the URL of a new transaction; if we don't get that the payload is invalid; 3) If the payload is valid (i.e., there is a task to do), prepare the local filesystem for the operation, and poll the server to see if the outputs of the current assigned task already exist on the server. If the outputs already exist skip the message. If they do not, launch a task process, download inputs (e.g., transaction video, or output of a previous task) to the task; 4) Complete the task on the inputs to produce outputs. The output directory is passively synchronized with the cloud by uploading any created files. The inputs, outputs, functionality, and models employed by each type of compute mainloop will be described with reference to FIGS. 5-12.

When a bodega posts a transaction message on PubSub queue, the message can be fanned out to as many recipients as required. One of the recipients is the transaction evaluator mainloop (e.g., see FIG. 5) which is triggered for each transaction and runs processes based on the reach and multibox models (described below) on the transaction video data (as represented by transaction evaluator 502). Transaction evaluator 502 receives reach model 503, multibox model 504, and transaction video 505 (via ring buffer 506 and frame queue 508) as input, and is the primary mechanism for generating unlabeled machine learning examples from transaction videos. The outputs of the transaction evaluator mainloop include image data 510 which is indexed to model annotations data 512 (i.e., together being the images with automated labeling), as well as raw TFRecords data 514 which are the raw, unlabeled image data.

Figure 6:
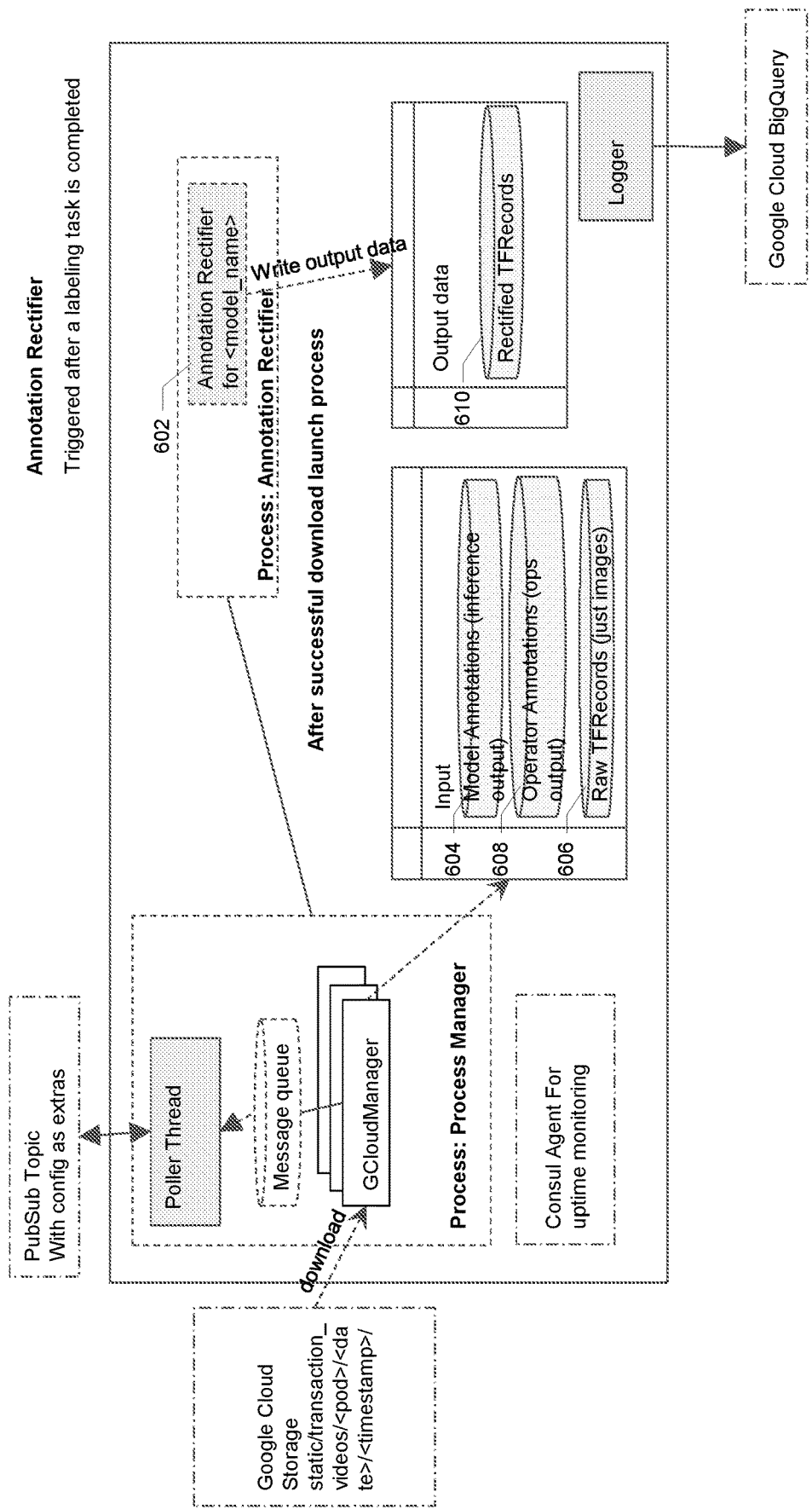

The annotation rectifier mainloop (which is triggered by completion of a labeling task) is the mechanism by which raw machine learning examples and provided labels are turned into final examples ready for training. As depicted in FIG. 6, the annotation rectifier mainloop can be run for various models, e.g., the reach model, multibox model, etc., (as represented by annotation rectifier 602). Annotation rectifier 602 receives as input model annotations data 604 and raw TFRecords data 606, both generated by the transaction evaluator mainloop over typically multiple transactions. Annotation rectifier 602 also receives operator annotations data 608 (e.g., crowdsourced labeling data) with which annotation rectifier 602 corrects the labels generated automatically by the transaction evaluator mainloop, resulting in rectified TFRecords data 610.

Figure 7:
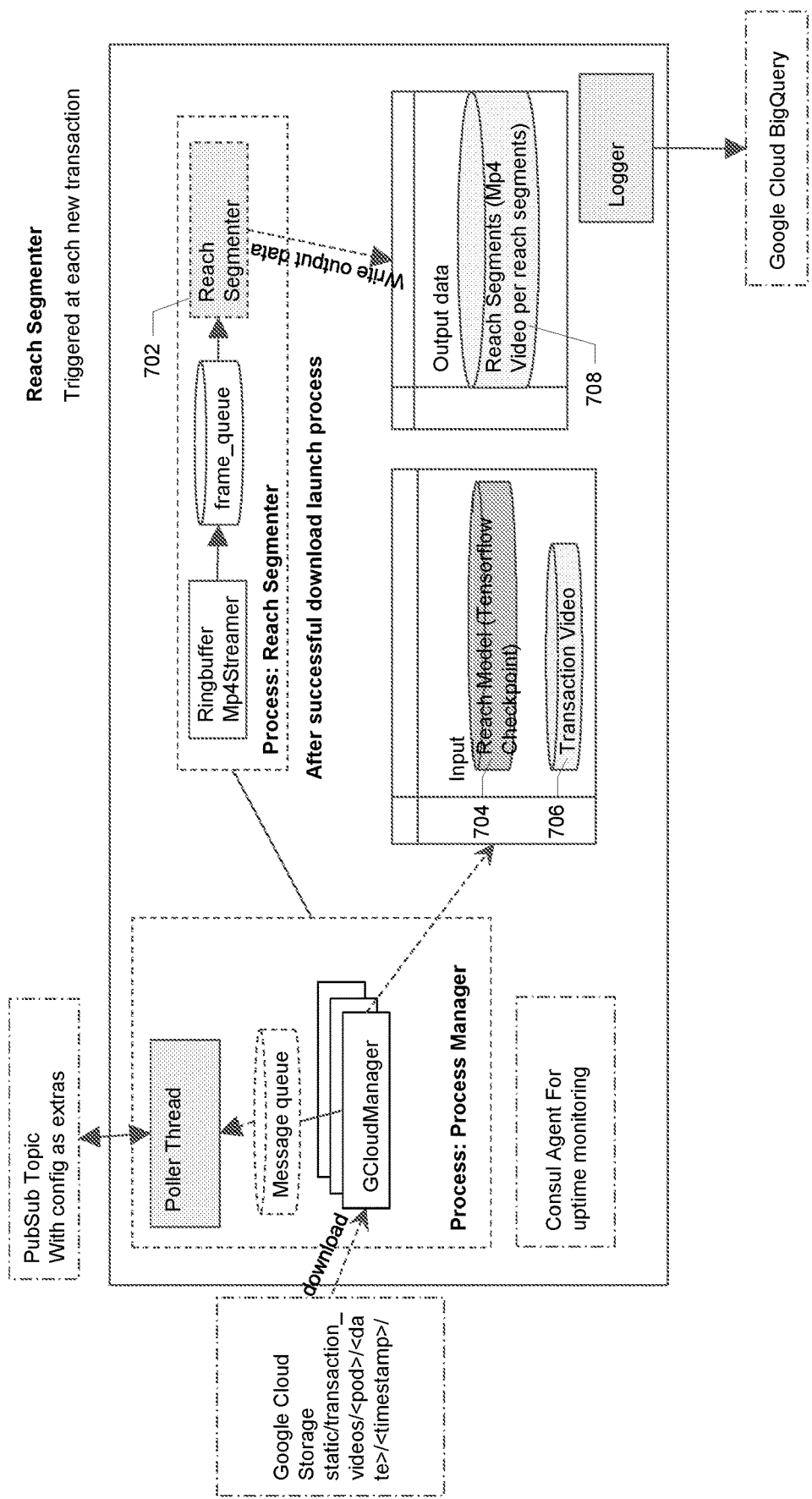

FIG. 7 depicts the reach segmenter mainloop which is triggered for each new transaction and which is the first inference mechanism in the "forward pass" evaluation of a transaction that identifies the relevant parts of the transaction video, e.g., when users are reaching into the shelves of the bodega. The remainder of the video in which users are not actively reaching for an item is discarded. This reserves computational resources for the salient/relevant parts of the transaction.

The operation of reach segmenter 702 is based on a reach model 704. The underlying premise is that a transaction might be several minutes long but there might only be a small number of salient moments when the user is actually reaching for or touching an item in the bodega. Reach segmenter 702 provides the state awareness to determine when those salient moments occur. Reach model 704 is a 3-state model that determines if the doors of the bodega are open or closed, and when users are "reaching" into the bodega (and are likely to be picking up or putting back an item). Reach segmenter 702 reads in the image frames from transaction video 706 uploaded by the bodega, evaluates when a reach event is occurring, edits the video accordingly (for subsequent processing by other tasks/models), and then writes the edited video (reach segments 708) to its local directory (which is mirrored to the cloud). A transaction is ended when the doors close and lock, or after some amount of time has elapsed, e.g., 10 minutes. As will be discussed, the reach segmenter and reach model may also be used to detect fraud, e.g., when someone breaks the door open, in which case it also starts a transaction.

Figure 8:
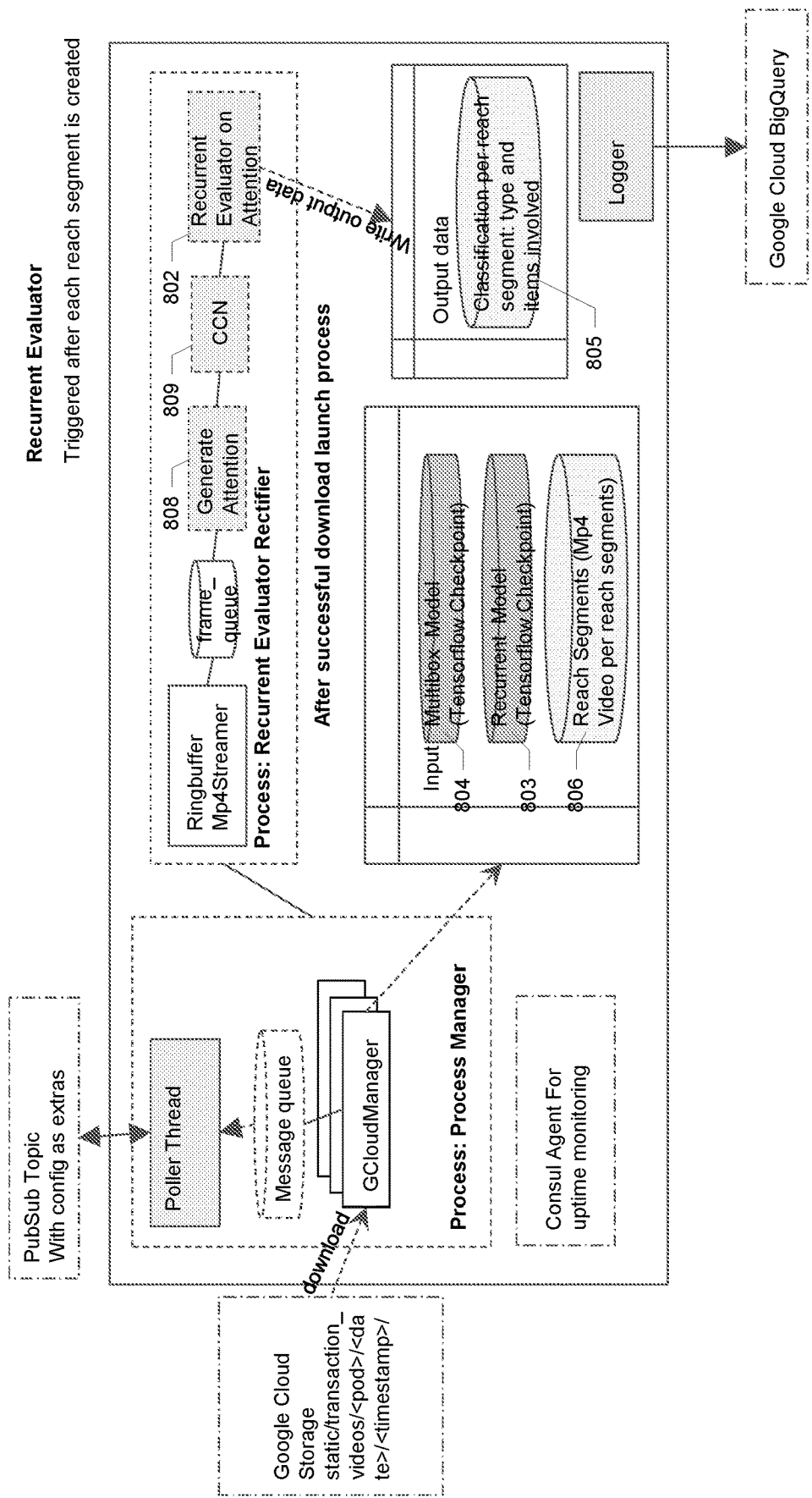

FIG. 8 depicts the recurrent evaluator mainloop which is triggered for each reach segment that is generated by the reach segmenter. Recurrent evaluator 802 is similar to the transaction evaluator, but is triggered for each new reach segment that is created. It is the second inference mechanism in the "forward pass" evaluation of a transaction. Recurrent evaluator 802 uses recurrent model 803 (a Long Short-Term Memory (LSTM) recurrent neural network), multibox localization model 804, and the outputs of a pre-trained deep convolutional neural network (represented by CNN 809) to generate classification data 805 of each of reach segments 806 in two ways: 1) it infers what happened during the segment (e.g., user grabbed an item, user put something back, user didn't do anything (false positive), user reached into a different shelf (false positive)); and 2) it infers which items were taken during the transaction (providing a probability for each item involved).

The multibox localization model detects where hands (empty or full) are. When this model is combined with, for example, a reach state from the reach segmenter, significant information can be obtained by, for example, detecting when a hand changes from empty to full during the reach. The multibox model uses a single shot detector to introduce geometric context, localizing the users' hands and determining if they are empty, holding an item, holding a phone, as well as localizing users' faces/backs of heads. A single shot detector (SSD) provides a unified framework for object detection which requires only single forward pass through the data. An example of such a SSD is described in *SSD: Single Shot Multibox Detector* by Wei Lu, et al., (v5 dated Dec. 29, 2016), Cornell University Library arXiv.org citation arXiv:1512.02325, the entire disclosure of which is incorporated herein by reference for all purposes. The use of the multibox model provides an attention mechanism (808) for recurrent evaluator 802 to perform classification on each generated reach segment.

According to a particular class of implementations, a diff infrastructure is employed in which consecutive images of the transaction video are passed through a convolutional net, combined, and then followed by a bounding box localization to identify locations at which changes have occurred. When this information is combined with information derived from the live inventory view, the change that is occurring can be identified, including (in cases where the change corresponds to an item) what the item is, and that generates the diff; the guess or inference of what was taken in the transaction. The localization of the diff with the bounding box gives a location, and the live inventory view gives what item is in that location.

Figure 9:
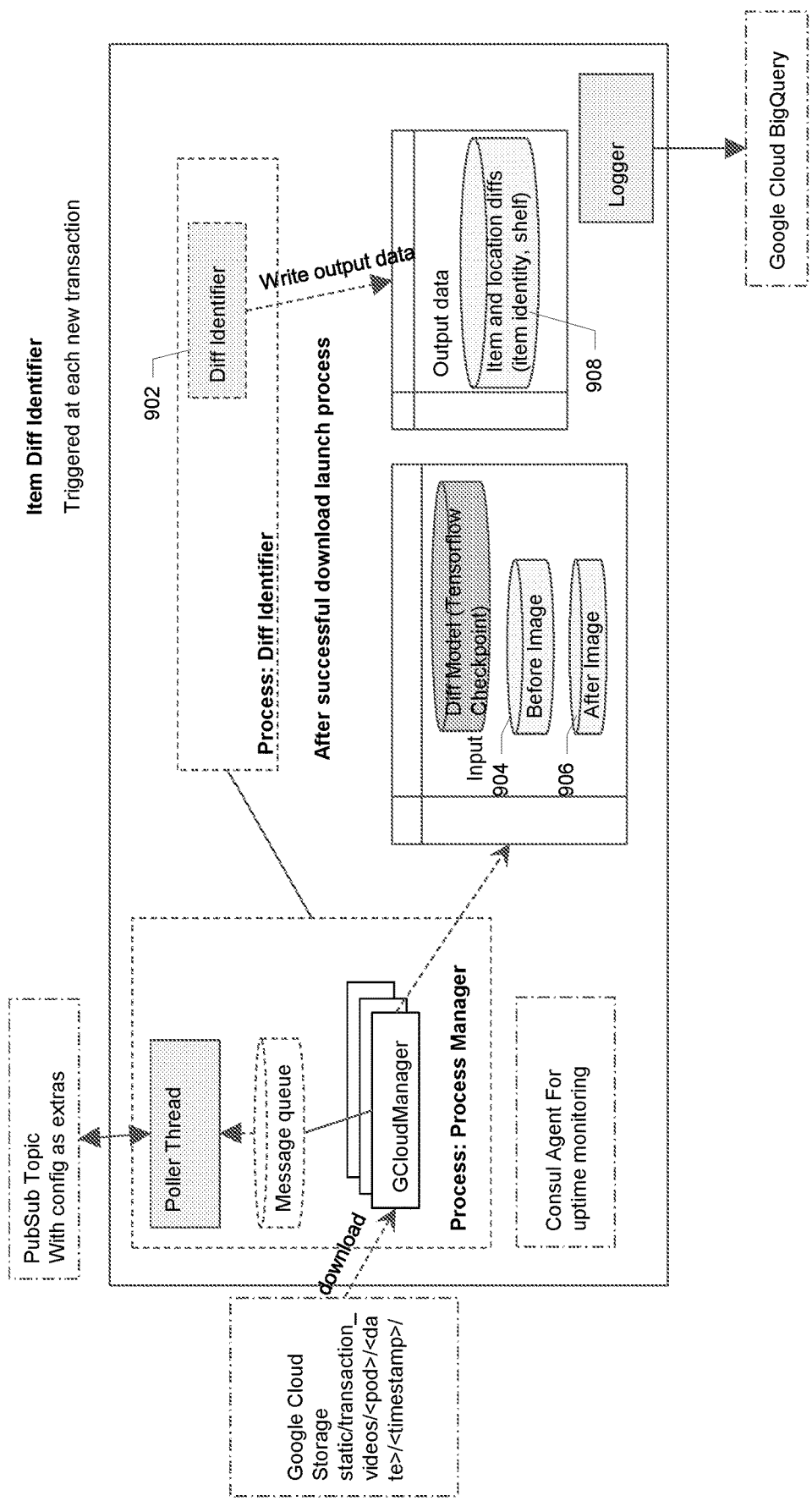

FIG. 9 depicts the item diff identifier mainloop which is triggered for each new transaction. Diff identifier 902 is the primary mechanism for the "backwards pass" evaluation of the transaction that looks at the internal views of the bodega before (904) and after (906) the transaction and identifies where there have been any inventory differences. It utilizes a modified implementation of the single shot detector and generates item and location diffs 908 of where items have been changed. A second single shot detector instance may also be run to identify the items on the shelves at the locations where changes occurred.

Figure 10:
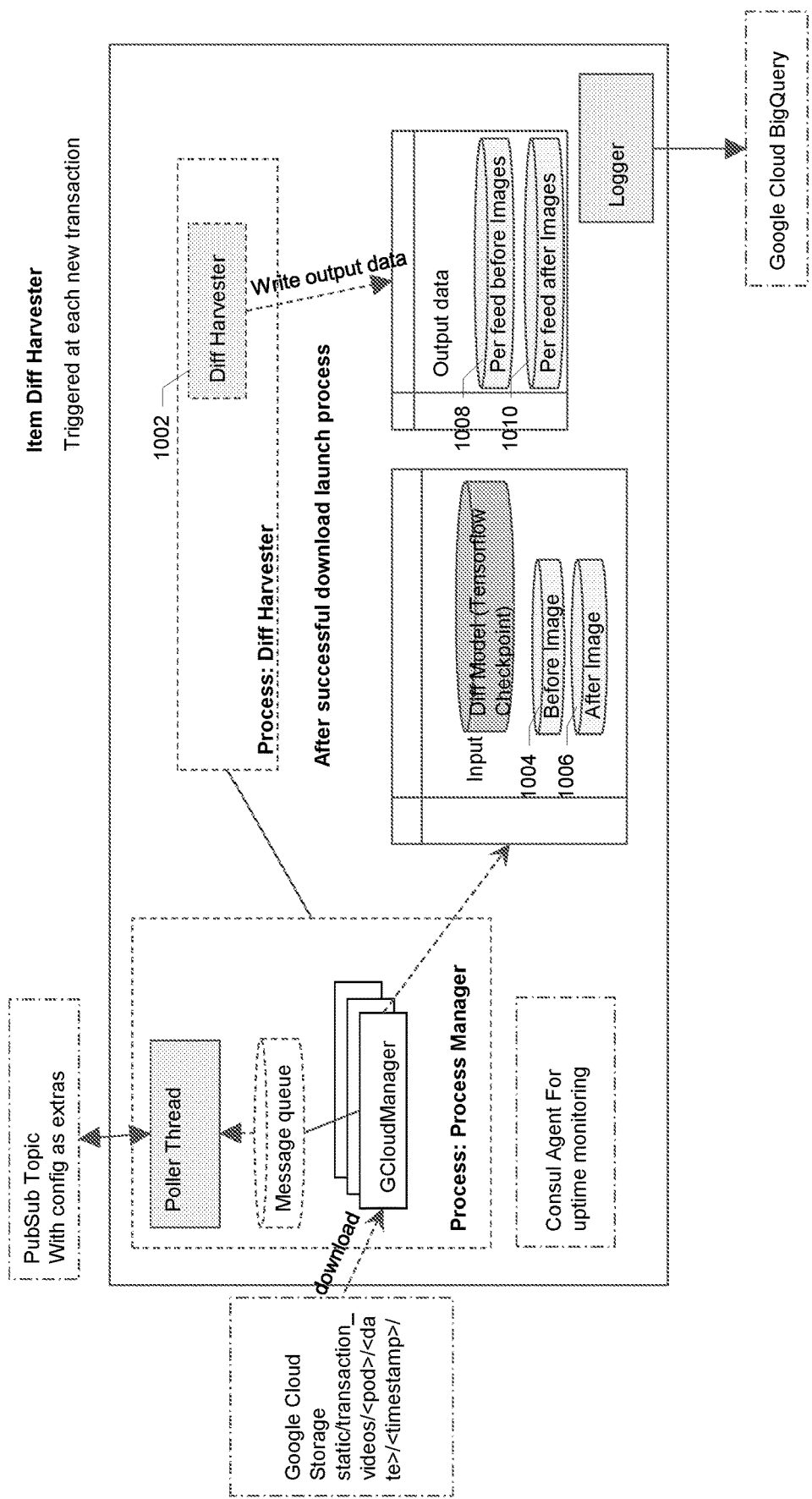

FIG. 10 depicts the item diff harvester mainloop which is triggered for each new transaction. Item diff harvester 1002 is the primary mechanism for generating training data for the models employed by the item diff evaluator. This loop takes the before (1004) and after images (1006) from the bodega, and cuts up the images on a per camera basis to generate per-camera before images 1008 and per-camera after images 1010. Labels are applied (e.g., by a crowdsource service such as Crowdflower) where there have been any differences in the inventory, as well as to every visible item in each view. The labelers may be provided with information about which items are likely to be on which shelves to improve labeling accuracy.

Figure 11:
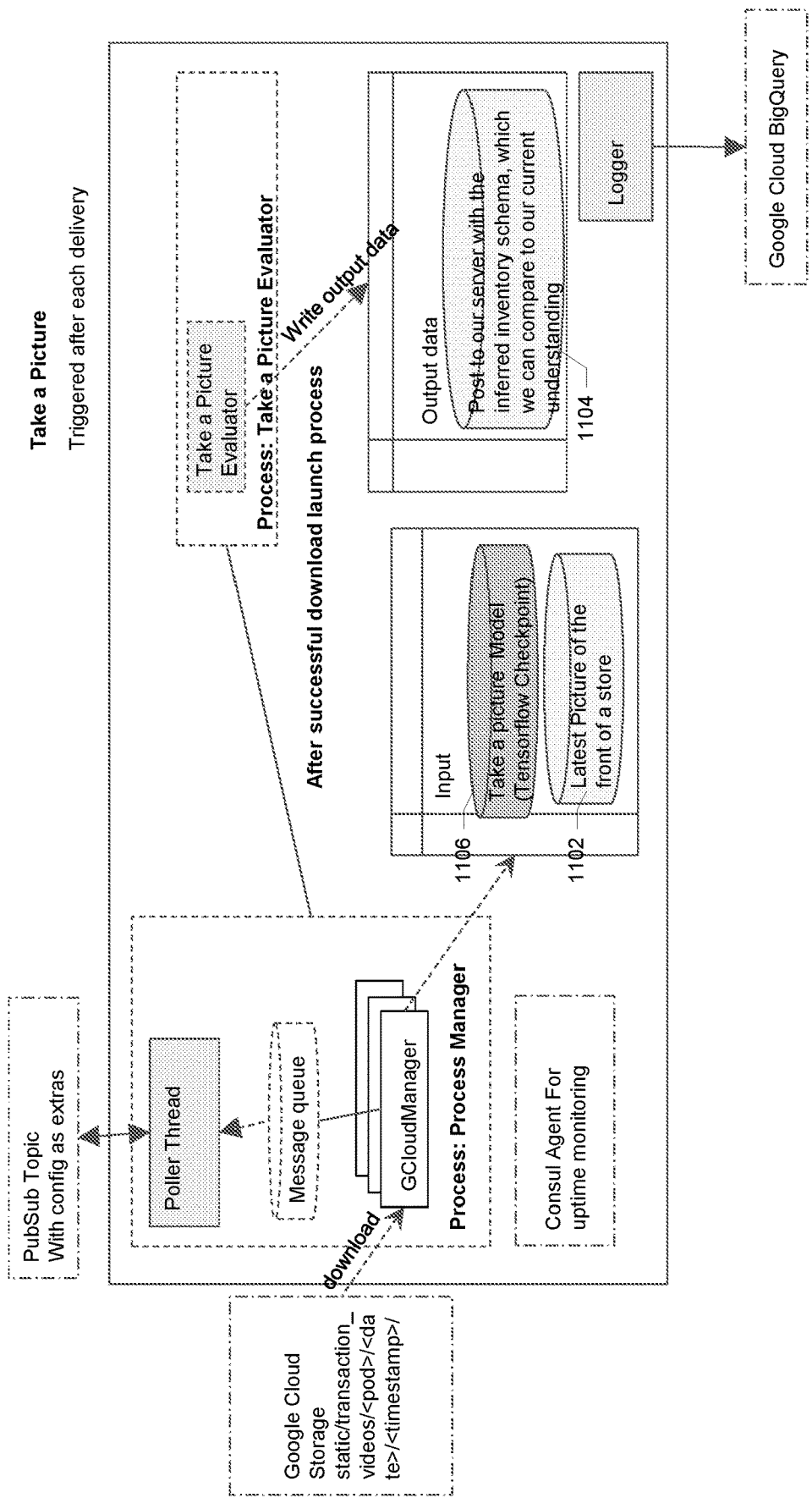

FIG. 11 depicts the take-a-picture evaluator mainloop which is triggered after each delivery of items to a bodega. During the delivery flow by which bodegas are restocked, the delivery technician takes a picture of the front of the bodega. These images 1102 are labeled (e.g., by a crowdsource service) to generate a model 1104 which can identify the items in a bodega from this frontward facing view; this allows us to compare our current "digital" schema with what's live in the real world. Take-a-picture model 1106 is another implementation of the single shot detector model.

Figure 12:
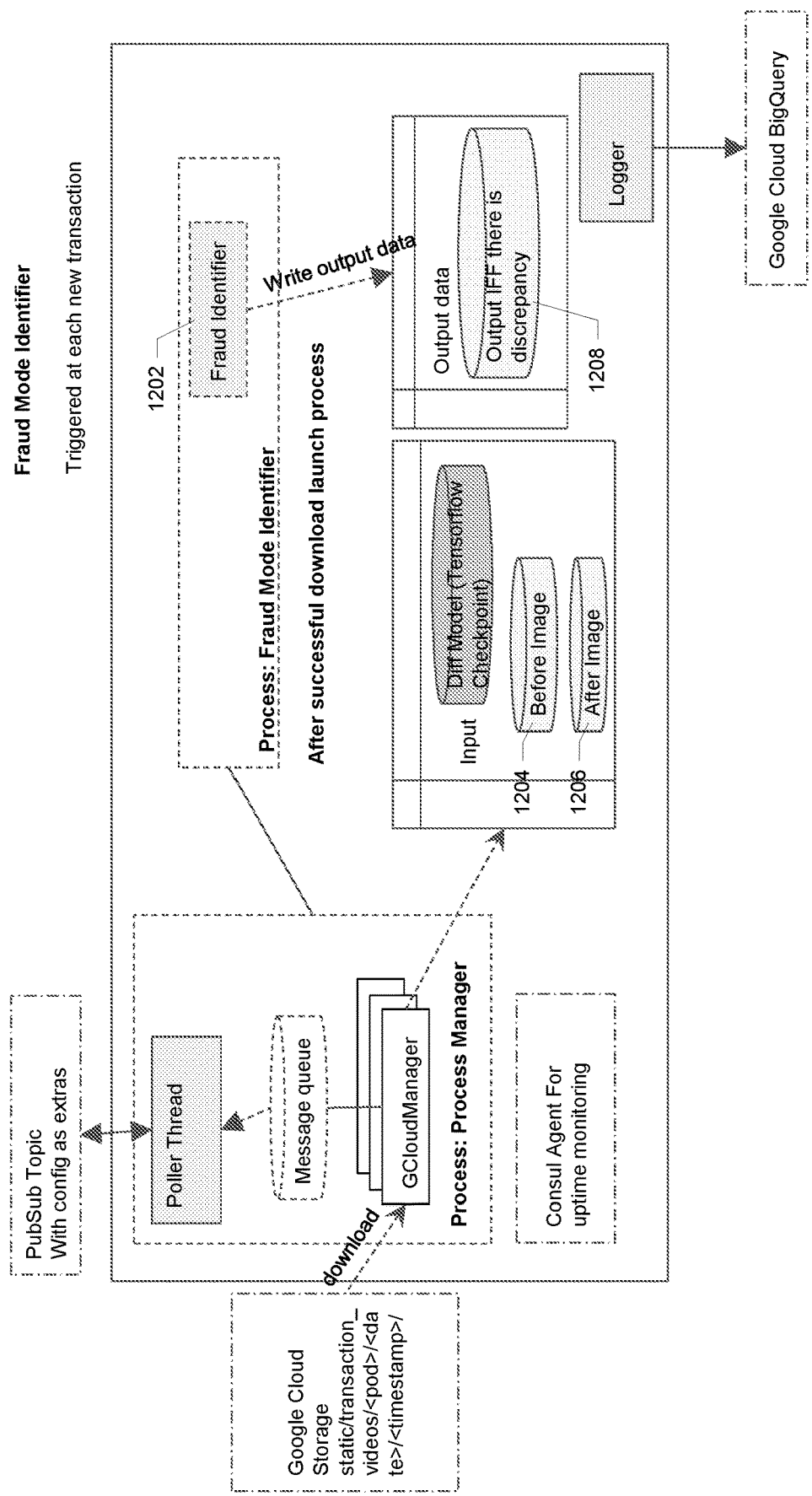

FIG. 12 depicts the fraud mode identifier mainloop which is triggered with each image that is passively uploaded. The fraud mode evaluator mainloop is implemented similarly to the item diff identifier except that fraud identifier 1202 is run on before (1204) and after (1206) images that are passively uploaded every hour, as well as before and after images that are passively uploaded every 10 minutes whenever a user leaves the bodega doors open after a transaction (which causes the bodega to enter into a fraud mode in which video is passively recorded locally by the bodega, but not uploaded). If any changes are identified (1208), the passively recorded video can then be uploaded to determine what happened. The point of the fraud mode identifier mainloop is to identify when fraud may have occurred, so that corresponding losses may be tracked.

As will be appreciated, a larger automated store may operate with a back end infrastructure similar to that depicted in FIGS. 4-12 in a similar manner to the bodega illustrated in FIG. 3 with differences that facilitate the greater scale and/or additional complexity represented by the duplication of various resources and the tracking of multiple simultaneous transactions. For example, cameras would be deployed throughout the store to identify individual users and their locations, and to identify the products removed from shelves and placed in baskets or carts. Cameras or other sensors could be deployed in the baskets or carts to facilitate product identification as discussed above. Baskets and carts could also have identifiers (e.g., visual identifiers, RFID tags, etc.) so that they could be associated with an identified user for the purpose of connecting activity throughout the store to a specific transaction and/or tracking a user's location. Otherwise, the operation of such a store may be substantially similar to that depicted in FIGS. 3-12.

According to some implementations, the user initiates a transaction by entering a 3-digit code of a bodega in a smart phone app which sends a message specific to the user and identifying the bodega to a URL on an authentication server. If the server authenticates the user it sends an open door message (e.g., a JWT (JSON) UDP style message) to the IP address of the bodega on the private mesh network, which then lights up, chimes, and unlocks its doors. At this point the back end infrastructure hasn't logged anything transaction related other than the fact that a specific user tried to authenticate at a specific bodega. The real notion of the transaction comes from the bodega which waits for both doors to be closed and locked (the session termination signal) or for some period of time to pass, e.g., 10 minutes (at which point fraud detection mode is triggered as described above). In response to the session termination signal, the bodega terminates the transaction, completes writing of the transaction video, posts a message to the back end that a specific user engaged in a transaction at a specific bodega, and uploads the transaction video to the back end, publishing the message to PubSub with a path to the corresponding transaction video. The various processing mainloops then run their models on the transaction video as described above.

An alternative access control and transaction initiation mechanism could involve the use of machine-readable codes displayed on the mobile devices of users, e.g., conventional bar codes or short-lived Quick Response (QR) codes. Such a QR code could be provided to the user's device upon, for example, launch of the app, approach to the bodega or store location, or in response to a request from the user's device. Alternatively, biometric recognition of the user may be used to facilitate access control and/or transaction initiation. For example, facial recognition may be based on techniques described in Single Shot Multibox Detector incorporated herein by reference above.

According to some implementations, the various machine learning (ML) models (based on convolutional neural networks (CNNs) and/or recurrent neural networks (RNNs)) may be trained with manual input from human users (e.g., via a crowdsource service) viewing the captured images and labeling parts of those images. For example, "manual click labeling" can be used in which the human user uses a mouse or other suitable input device to repeatedly select (e.g., by clicking on) a user's hand as it enters and exits the bodega.

This centers a bounding box on the user's hand in the labeled data which may then be used by the CNN as training data to learn to track such hand movements for live transaction tracking.

Such an approach may be used to identify other data of interest for training purposes to support other system functionality and the evolution of corresponding machine learning models including, for example, product identification, facial recognition, person tracking, etc. The human user labeling the data may also select more than one location at a time for situations in which, for example, a user is reaching with both hands, there are multiple people in the current view, or multiple before-and-after diffs.

Training machine learning models requires a considerable amount of labeled data. According to some implementations and as discussed above, a publisher-subscriber model may be employed to asynchronously generate new training labels at scale. This model allows for the processing of new transaction data within minutes of the transactions being completed. When a user completes a transaction, the bodega or store uploads a corresponding video and a PubSub message so that system is alerted that a new video is available for processing. The video is run through existing machine learning models operating in the cloud which predict labels for some or all of the frames. These labels may be manually reviewed which allows for the collection of performance and false-positive statistics for the current models while simultaneously growing the "golden set" of training data, i.e., accurately labeled frames.

It may be important to balance the data used to generate training data to allow the models to generalize more quickly to new situations. According to some implementations, to ensure a good mix of data from different bodegas and from different feeds for each bodega, a balancer process periodically pulls records from the annotation rectifier pipeline and balances them by label, bodega, and feed, to create a diverse data set.

Some implementations employ Cloud ML to initiate automated training jobs. Cloud ML is a Google service in which jobs can be run at different learning rates to determine the right one to train the models correctly. Cloud ML then writes its outputs to a standard location from which all of the compute loops can read.

If it appears that any of the models need to be retrained, cloud-based GPU instances may be brought online to retrain the models using the golden set training data. Once this retraining is complete, the updated models may be pushed back out to the stores or bodegas without interruption of service to users.

According to one approach to model training, there are two types of tasks for the human operators. The first type of task assigns a single categorical label to each frame of video. The operator can see the frames of the video with the automatically assigned label superimposed over each frame. In one implementation, each frame is surrounded by a colored frame that represents one of a set of labels for the model being evaluated. For example, for the model used by a reach classifier, a blue frame could represent that the bodega door is closed, a green frame that the door is open, and a red frame for when a "reach" is detected, i.e., a human had has entered the bodega. The human operator would manual review these label assignments and change the color of any that are incorrect. Once the labels are corrected and verified, they are saved for further processing.

The second type of task involves the placement of bounding boxes in areas of interest in a frame. Continuing with the example of the reach classifier model, for the frames that are labeled "reach," the human operator places a bounding box around the hand in each frame by clicking on the hand in that frame. If there are several consecutive frames with a hand in the same position, the operator can label these frames at the same time. Operators can also change the size of the bounding boxes and remove boxes if necessary.

In addition to reducing transaction friction and facilitating inventory management and prediction, the models used and the data gathered by systems enabled by the present disclosure may be leveraged to support a variety of functions. For example, the inventory of a particular bodega or store can be optimized (e.g., dynamically rotated) based on an understanding of the habits of the users for that bodega or store. In another example, dynamic pricing/price elasticity models can be implemented in which the price of products can be dynamically adjusted both at ordering time and for live promotions and deals, e.g., based on the demographics of an identified user and data from a variety of other sources (e.g., geo-location, local weather, etc.).

According to a class of implementations, a supply chain with enhanced visibility and accountability taps into the machine learning and model infrastructure described herein. As will be understood, it is a considerable challenge to provide inventory tracking that is sufficiently robust to ensure that inventory is not lost throughout the supply chain. Because the techniques described herein support a strong understanding of what is at the end point of the supply chain, e.g., on the shelves of a particular bodega, that information may be used upstream to reduce inventory loss.

A supply chain typically includes or involves warehouses, logistics mechanisms (e.g., shipping, delivery, etc.), retail locations, (e.g., bodegas, automated stores, etc.), and users. At the warehouse personnel pack boxes which are then driven to the retail locations (e.g., the bodegas) by delivery personnel who then stock those locations. Periodically, e.g., at the beginning of each day, the diff infrastructure is leveraged to determine which bodegas need items. For example, the inventory for a given bodega might indicate that there should be 10 units of a particular item with a restock threshold of 3. If one or more diffs determine that the bodega only has 2 of those items, the decision is made to ship 8. Such a decision results in creation of a work flow in which every person who touches an item interacts with a task bar in a corresponding dashboard interface that indicates what that person is doing, e.g., placing an item into a box at the warehouse, loading the box on a truck, placing an item from the box in a bodega, etc. The id of the warehouse personnel and the specified item(s) are part of an audit trail; same for the driver, the box, and the stocking of items in the bodega. Theoretically, items don't leave the supply chain until taken from a bodega by an end user. Each item has to have an entrance (from the supplier) and an exit (purchased); it can't just disappear. Any sort of loss (e.g., a missing item) and a null vector is generated that identifies the missing item(s) and the relevant part of the audit trail, e.g., the last person who "touched" the missing item(s).

The driver who stocks a bodega may also be provided with an audit list of items to audit at the bodega. The list might include items for which mistakes may have been made during transaction processing. For example, the driver might be asked to audit the most frequently taken items for that bodega, or locations in the bodega from which objects are most frequently taken (e.g., a "heat map" of reaches). The driver takes a picture of the front of the bodega before restocking. The picture is segmented and compared it to a multi-view image of the stocked bodega schema. This comparison helps to determine whether something is off and/or should be audited.

In implementations employing inventory rotation and/or dynamic pricing, configurable electronic price displays (e.g., LED displays) can be used to display current prices. Such implementations may also benefit from predetermined shelf schema and/or a reach classifier that provide additional information regarding which items are selected by users. Knowing where the user's hand is allows for identification of the shelf from which a product was removed.

It will be understood by those skilled in the art that changes in the form and details of the implementations described herein may be made without departing from the scope of this disclosure. For example, the techniques described herein are not limited to supporting retail transactions. Implementations are contemplated in which these technique may be used in other settings such as, for example, home environments for tracking the contents and usage of products in a refrigerator or pantry, information which could be used to generate a shopping list or to automatically order new items. In addition, although various advantages, aspects, and objects have been described with reference to various implementations, the scope of this disclosure should not be limited by reference to such advantages, aspects, and objects.

What is claimed is:

1. A system, comprising:
a remote computing device; and
a product enclosure including a door, a camera, a first memory, and a first processor configured to execute instructions stored in the first memory to:
unlock the door based on a message received from a computing device;
capture, using the camera, a sequence of images associated with a transaction involving a product stored within the product enclosure, wherein a first image of the sequence of images is captured after the door is unlocked;
produce a sub-sequence of images by discarding, from the sequence of images, each image not depicting a hand of a user associated with a user account reaching into the product enclosure; and
transmit the sub-sequence of images to the remote computing device responsive to at least one of the door locking or passage of a predetermined period of time,
wherein the remote computing device includes a second memory and a second processor configured to execute instructions stored in the second memory to:
charge the user account an amount associated with the transaction based on a processing of the sub-sequence of images using a machine learning model; and
further train the machine learning model using data associated with the processing of the sub-sequence of images.

2. The system of claim 1, wherein, to charge the user account the amount associated with the transaction based on the processing of the sub-sequence of images, the second processor is configured to execute the instructions stored in the second memory to:
identify, based on the sequence of images, the hand reaching into the product enclosure and that the product is grasped by the hand.

3. The system of claim 2, wherein, to identify the hand reaching into the product enclosure and that the product is grasped by the hand, the second processor is configured to execute the instructions stored in the second memory to:
label a bounding box around one or more objects of interest within an image of the sub-sequence of images.

4. The system of claim 3, wherein, to charge the user account the amount associated with the transaction based on the processing of the sub-sequence of images, the second processor is configured to execute the instructions stored in the second memory to:
track changes associated with one or both of the product or the product enclosure based on bounding boxes labeled within images of the sub-sequence of images to determine an inference associated with the transaction; and
charge the user account based on the inference.

5. The system of claim 2, wherein, to identify the hand reaching into the product enclosure and that the product is grasped by the hand, the second processor is configured to execute the instructions stored in the second memory to:
compute diffs based on successive images of the sub-sequence of images.

6. The system of claim 2, wherein, to charge the user account the amount associated with the transaction based on the processing of the sub-sequence of images, the second processor is configured to execute the instructions stored in the second memory to:
identify that the product is grasped by the hand based on a product location schema associated with a spatial context of the product enclosure.

7. The system of claim 1, wherein the second processor is configured to execute the instructions stored in the second memory to:
update inventory records associated with the product based on the transaction.

8. The system of claim 1, wherein the message is transmitted to the product enclosure responsive to an identification of the user.

9. The system of claim 8, wherein the computing device from which the message is received is one of the remote computing device or a user device of the user.

10. The system of claim 8, wherein the identification of the user is based on one or more of biometric information associated with the user, a code associated with the user, or a detection of the user in front of the product enclosure.

11. A method, comprising:
unlocking a door of a product enclosure based on a message received from a remote computing device;
capturing a sequence of images associated with a transaction involving a product stored within the product enclosure, wherein a first image of the sequence of images is captured after the door is unlocked;
producing a sub-sequence of images by discarding, from the sequence of images, each image not depicting a hand of a user associated with a user account reaching into the product enclosure;
transmitting the sub-sequence of images to the remote computing device responsive to at least one of the door locking or passage of a predetermined period of time;
charging the user account an amount associated with the transaction based on a processing of the sub-sequence of images at the remote computing device using a machine learning model; and
further training the machine learning model using data associated with the processing of the sub-sequence of images.

12. The method of claim 11, wherein charging the user account the amount associated with the transaction based on a processing of the sub-sequence of images at the remote computing device comprises:
   identifying, based on the sequence of images, the hand reaching into the product enclosure and that the product is grasped by the hand.

13. The method of claim 12, wherein identifying the hand reaching into the product enclosure and that the product is grasped by the hand comprises:
   tracking changes associated with one or both of the product or the product enclosure based on bounding boxes labeled within images of the sub-sequence of images.

14. The method of claim 12, wherein identifying the hand reaching into the product enclosure and that the product is grasped by the hand comprises:
   identifying that the product is grasped by the hand based on a product location schema associated with a spatial context of the product enclosure.

15. The method of claim 11, wherein the message is transmitted to the product enclosure responsive to an identification of the user based on one or more of biometric information associated with the user, a code associated with the user, or a detection of the user in front of the product enclosure.

16. An apparatus, comprising:
   a memory; and
   a processor configured to execute instructions stored in the memory to:
      transmit, to a product enclosure, a message configured to cause a door of the product enclosure to unlock;
      obtain, in response to at least one of the door of the product enclosure locking or passage of a predetermined period of time, a sub-sequence of images associated with a transaction involving a product stored within the product enclosure, wherein the sub-sequence of images is produced by discarding, from a sequence of images captured using a camera of the product enclosure, each image not depicting a hand of a user associated with a user account reaching into the product enclosure, and wherein a first image of the sequence of images is captured after the door is unlocked;
      process the sub-sequence of images using a machine learning model to charge a user account an amount associated with the transaction; and
      further train the machine learning model using data associated with the processing of the sub-sequence of images.

17. The apparatus of claim 16, wherein, to transmit the message configured to cause the door of the product enclosure to unlock, the processor is configured to execute the instructions to:
   transmit the message to the product enclosure responsive to an identification of the user.

18. The apparatus of claim 16, wherein the message is further configured to cause one or both of a light of the product enclosure to turn on or a speaker of the product enclosure to play a sound.

19. The apparatus of claim 16, wherein, to process the sub-sequence of images to charge the user account the amount associated with the transaction, the processor is configured to execute the instructions to:
   identify, based on the sub-sequence of images, that the product is grasped by the hand reaching into the product enclosure.

20. The apparatus of claim 16, wherein the processor is configured to execute the instructions to:
   update inventory records associated with the product based on the transaction.

* * * * *